Figure 1:
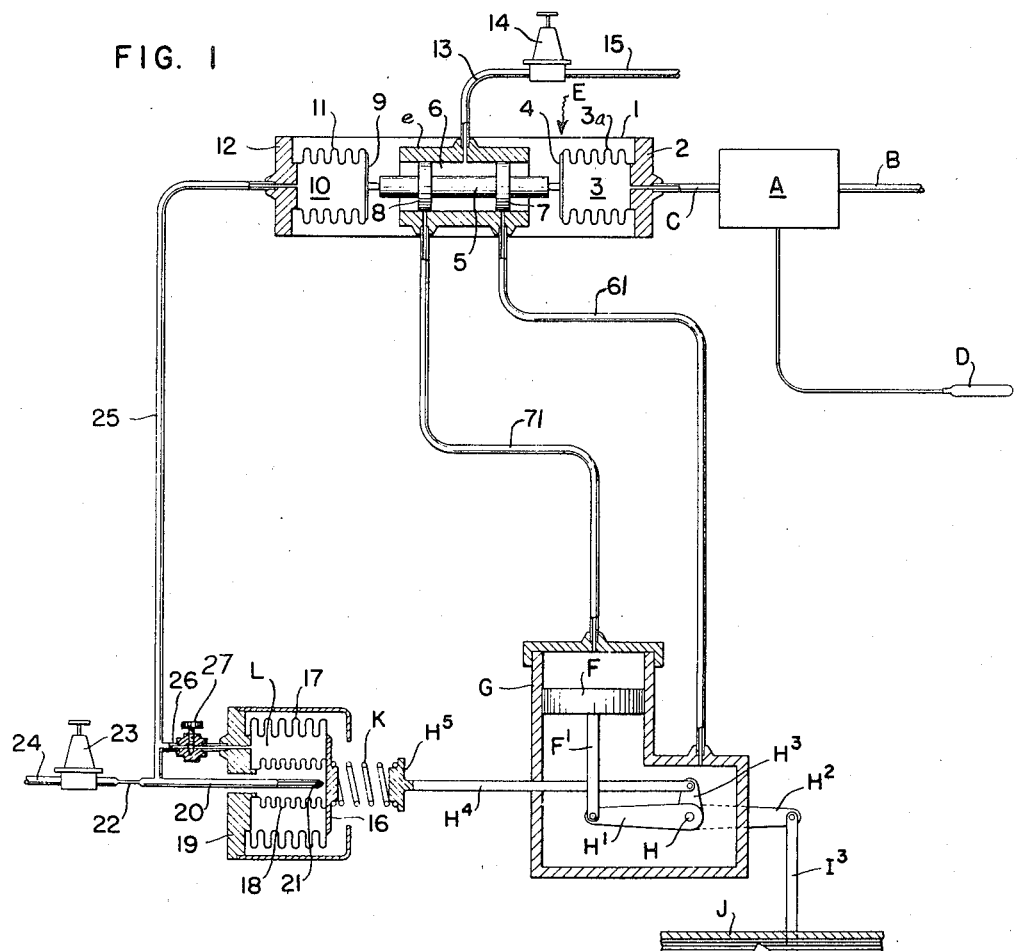

Oct. 11, 1949.

D. P. ECKMAN 2,484,557

AIR OPERATED CONTROL APPARATUS WITH
ANTIHUNTING COMPENSATION
Filed Sept. 11, 1947

*INVENTOR.*
DONALD P. ECKMAN

BY Arthur H. Swanson

ATTORNEY.

Patented Oct. 11, 1949

2,484,557

UNITED STATES PATENT OFFICE 2,484,557

AIR-OPERATED CONTROL APPARATUS WITH ANTIHUNTING COMPENSATION

Donald Preston Eckman, Ithaca, N. Y., assignor, by mesne assignments, to Minneapolis-Honeywell Regulator Company, Minneapolis, Minn., a corporation of Delaware Application September 11, 1947, Serial No. 773,398

4 Claims. (Cl. 121—41)

The present invention relates to control apparatus of the type in which relatively small variations in a variable control force cause an air actuated servo-motor relay of the power cylinder type to operate a butterfly valve, damper, ventilating louver or analogous control device requiring considerable power and length of piston stroke for its actuation. One commercial form of such apparatus, now in extensive use, is disclosed in the Moore Patent 2,237,038 of April 1, 1941.

In the operation of such apparatus, as ordinarily constructed heretofore, difficulty is experienced in many cases from the tendency of the butterfly valve or other final control element, to oscillate or hunt, and the general object of the present invention is to provide such apparatus with simple and effective means for eliminating or greatly reducing its oscillating tendency. A more specific object of the invention is to provide such apparatus with simple and effective means for neutralizing the tendency of the inertia forces to produce over-travel of the servo-motor piston and the final control element in each adjustment made necessary by a controlling condition change.

In the operation of such apparatus, the normal or stabilized position of the butterfly valve or other final control element, varies in accordance with changes in the value of the control force. With such apparatus as ordinarily constructed heretofore, on each change in the control force, the air pressure conditions in the power cylinder are varied to continuously subject the air cylinder piston to an actuating force tending to move the butterfly valve or other final control element from its previous position into a new position corresponding to, and predetermined by the current value of the control force. Such control of the position of the final control element may be termed proportional or position control, and has been found objectionable in some cases, because at the instant at which the final control element attains its new position, the inertia of that element and of the power cylinder piston and their mechanical connections prevent the element from coming to rest when it reaches its new position. The resultant overtravel of the final control element requires a return adjustment of the latter, and in many cases, gives rise to an oscillating or hunting movement of the element whereby the latter is moved alternately in opposite directions through the position in which it should come to rest.

A practically important object of the present invention is to provide novel means characterized by its simplicity and effectiveness for supplementing proportional or position control of the final control element, by a rate responsive or anticipatory control which will reduce the velocity of movement of the final control element to zero as that element moves into or closely approaches its new position following each change in the controlling force or condition.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Figure 2:
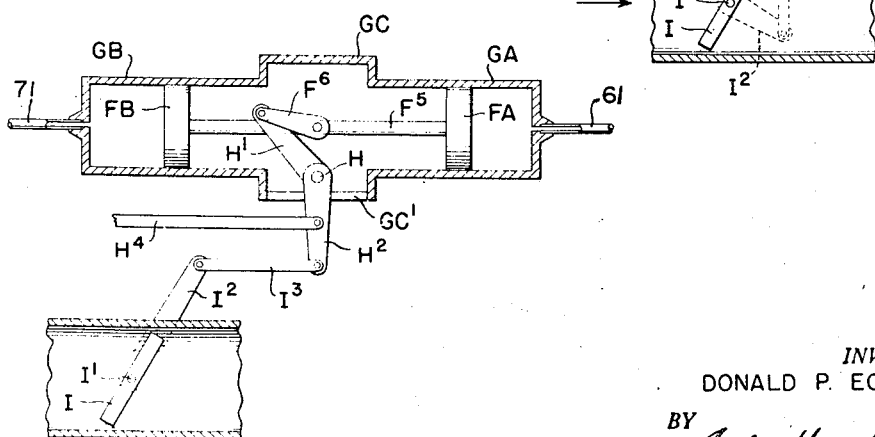

Of the drawing:

Fig. 1 is a somewhat diagrammatic sectional elevation of one embodiment of the present invention; and Fig. 2 is a somewhat diagrammatic elevation illustrating a modified form of the power cylinder shown in Fig. 1.

In Fig. 1, A represents a control device, shown as an air controller connected by a pipe B to a source of air under a predetermined pressure and discharging air through an outlet C at a pressure varying in accordance with changes in a condition to which a device D responds. For example, the device D may be a pressure thermometer bulb responsive to the temperature in a furnace combustion chamber (not shown). The regulated pressure in the pipe, then transmitted by pipe C to a pilot valve mechanism E, constitutes a control force proportional to the furnace temperature. The latter regulates the pressures acting on the opposite sides of the piston F working in a power cylinder G and operating through a crank shaft H connected to said piston, to adjust a butterfly valve I in a conduit J. The latter may supply combustion air, fuel gas, or a combustible mixture of air and gas, to said furnace chamber, in response to variations in the temperature to which the element D is responsive, so as to tend to maintain that temperature constant. The air controller A may be of any usual or suitable type. For example, it may well be an air controller having follow-up and compensating or re-set provisions of the character disclosed in the Harrison and Side Patent 2,124,946 of July 26, 1938.

The pilot valve mechanism E, in the form shown comprises a frame structure 1 including a part 2 forming the stationary end of a bellows chamber 3 which has a movable end wall 4 connected to the stationary end wall by a resilient metallic bellows 3a. The control pressure conduit C of the air controller A opens into the bellows chamber 3. On an increase in the pressure transmitted to the chamber 3, the corrugated wall 3a elongates and moves the bellows end wall 4 to the left and thereby moves to the left the piston valve element 5 working in the open ended valve chamber 6 formed in a piston type pilot vale body e. The valve element 5 comprises two spaced apart piston portions 7 and 8 and a stem portion of reduced diameter comprising a central portion connecting the pistons 7 and 8, and end portions at the outer sides of said pistons which project through the open ends of the valve chamber 6. One end of said stem extends into engagement with the movable wall 4 of the bellows chamber 3. The other stem end extends into engagement with the movable wall 9 of a bellows chamber 10. The latter is surrounded by a corrugated bellows wall 11 which connects the movable end wall 9 of the chamber 10 to a stationary end wall 12. The latter forms a part of the framework 1.

A pipe 13 supplies air under a suitable pressure to the portion of the valve chamber 6 between the piston portions 7 and 8 of the valve member 5. The pipe 13 receives air through an adjustable pressure regulator 14 from a supply pipe 15. The latter may be connected to a compressed air system supplying air at a suitable pressure, for example, at a pressure of 90 pounds p. s. i. The regulator 14 may act as a pressure reducer delivering air to the pipe 13 at a pressure which, for example, may be 60 pounds p. s. i. The valve chamber 6 is formed with spaced apart ports in its wall connected by conduits 6l and 7l respectively, to the spaces in the power cylinder G at the under and upper sides of the piston F.

When the pilot valve member 5 is in its neutral position, its piston portions 7 and 8 close the ports respectively connected to the conduits 6l and 7l. When the valve member 5 is displaced to the left from its neutral position, the ports in the valve body are both opened. This permits pressure fluid to pass through pipe 7l to the portion of the chamber G above the piston F, and permits air to exhaust from the portion of the chamber G below the piston F through the pipe 6l and the right hand end of the valve chamber 6. This causes down movement of the piston F. When the valve member 5 is displaced to the right from its neutral position, the pilot valve ports to which the pipes 6l and 7l are connected, are both opened. In consequence, the pipe 6l is then in communication with the portion of the valve chamber 6 between the pistons 7 and 8, and the space in the cylinder G above the piston F is then open to the atmosphere through the pipe 7l and the left hand end of the valve chamber 6, and the piston F is moved upward.

The movement of the piston F which is initiated when the valve 5 is displaced in either direction from its neutral position would tend, in the absence of a return movement of the valve member 5, to continue until the piston reaches the corresponding limit of the range of movement permitted it by the structural form of the power cylinder. In the normal operation of the apparatus shown in Fig. 1, each displacement of the valve member 5 from its neutral position and resultant adjustment of the power cylinder piston F, produces a change in the pressure in the bellows chamber 10 which gives the valve member 5 a reverse movement. That pressure change ordinarily either returns the valve member to its neutral position, or if the apparatus is not properly calibrated, moves the valve member 5 past its neutral position, and thereby results in a reverse or return movement of the piston F.

As diagrammatically illustrated, the movement of the piston F oscillates the crank shaft H through a link F'' connecting the piston F to the end of a crank arm H' within the power cylinder G and carried by the portion of the shaft H. External to the cylinder G, the crank shaft H carries crank arms $H^2$ and $H^3$. The arm $H^2$ is connected by a ling $I^3$ to a crank arm $I^2$ secured to a portion of the butterfly valve shaft I' which is external to the conduit J. With the arrangement described up and down movements of the piston F give opening and closing adjustments to the butterfly valve I. The crank arm $H^3$ secured to the shaft H is connected to a horizontally disposed link or connecting rod $H^4$ which gives reciprocating movements in the direction of the length of the link to a crosshead or spring abutment $H^5$ connected to the end of the link $H^4$ remote from the crank arm $H^3$. When the piston F is in its intermediate position, the oppositely extending crank arms H' and $H^2$ are preferably substantially transverse to the axis of the piston F, and the arm $H^3$ is substantially vertical to the link. As shown in Fig. 1, the link $H^4$ and crank arm $H^2$ are substantially horizontal but the operation of the apparatus shown in Fig. 1 does not depend on the disposition of the apparatus with reference to the horizontal.

The abutment $H^5$ acts through a helical compression spring K against the movable end well 16 of a transmission bellows L. The latter comprises a corrugated outer bellows wall 17 and a coaxial corrugated inner bellows wall 18, of small diameter. Each of said walls extend between and is connected at its ends to the movable bellows wall 16 and to the stationary end wall 19 and a stationary nozzle coaxial with the rod $H^4$ extends through a central opening in the stationary end wall 19 and through the space surrounded by the inner tube 18, into contact with or close proximity to the movable wall 16 of the transmission bellows. That wall acts as a bleeder valve to variable throttle the bleed orifice 21 in which the adjacent end of the bore of the pipe 20 terminates. As shown, the nozzle 20 receives air through a restrictive orifice 22 from the outlet chamber of a pressure regulator 23 in which a pressure of 20 p. s. i. is maintained. The regulator 23 receives air under pressure through a pipe 24 which may be a part of the compressed air system which includes the pipe 15 and supplies air at a pressure of 90 pounds p. s. i. The variable bleed nozzle pressure at the outlet side of the restricted orifice 21, is transmitted from the nozzle 20 to the bellows chamber 10 by a pipe 25 opening into the last mentioned chamber through a port in the stationary end wall 12. The nozzle 20 is connected to the transmission bellows space, i. e., to the annular space between the bellows walls 17 and 18, by a branch conduit 26 including an adjustable flow restricting device 27 which may be a needle valve.

In operation of the apparatus shown in Fig. 1, increases and decreases in the temperature of the element D, result in movements of the valve member 5 away from its neutral position to the left and right respectively, and thereby produce down and up movements of the servo-motor piston F. Those piston movements operate through the crosshead $H^5$, spring k and bellows end wall member 16 on the nozzle 20 to produce variations in pressure in the bellows element 10 which tend to return the valve member 5 to its neutral position following each of its displacements from that position. Thus when the piston F moves downward and the crank shaft H turns counter-clockwise, the crosshead H⁵ moves the movable end wall of the transmission bellows L to the left, and thus reduces the rate at which air leaks or bleeds through the bleed nozzle orifice 21. Such throttling of the orifice 21 causes the pressure in the nozzle 20 to build up. The increased pressure is transmitted by the pipe 25 to the bellows chamber 10 and restores the normal equality of the pressure in the bellows chambers 3 and 10. Such pressure equalization re-establishes the normal lengths of the bellows elements 3 and 10, and returns the valve member 5 to its neutral position. It will be observed that return of the valve 5 to its neutral position is not necessarily attended by any change in the temperature of the thermometer bulb D.

Except for the hereinafter described effect of the restricted flow of air between the transmission bellows chamber and the pipe 25 through the conduit 26, the apparatus shown in Fig. 1 would provide typical proportional or position control of the position of the butterfly valve I. Thus, each increase in the temperature of the thermometer bulb D produces a corresponding increase in the controlling air pressure transmitted by the pipe C to the bollows 3. The increase in pressure to chamber 3 produces a down movement of the piston F in the air cylinder G which gives corresponding adjustments to the butterfly valve I and to the bleed valve formed by the bellows and wall 16 and nozzle 20. Thereupon the pressure in the nozzle 20 is increased and that pressure increase is transmitted by the pipe 25 to the bellows chamber 10 and increases the pressure therein until it returns the pilot valve element 5 to its neutral position.

If during the sequence of events just described, no further change in the temperature of the thermometer bulb D occurs, the butterfly valve I will move into the position in which it should be maintained, at approximately the same instant at which the valve element 5 is returned to its normal position. However, the inertia of the valve I, piston F and the mechanical elements connecting them, does not permit the movements of the valve and piston to be abruptly interrupted. In consequence, if the valve I has any appreciable angular velocity at the instant at which it turns into the position in which it should be maintained, it will inevitably move through that position. Such over-travel of the valve requires a return adjustment, and in many cases results in hunting, or oscillation of the valve back and forth through the position coresponding to the temperature of the thermometer bulb D. Operations which are the converse of those just described result from a decrease in the temperature of the thermometer bulb D and the initial displacement of the piston valve element 5 to the right from its neutral position.

Such over-travel of the butterfly valve I may be prevented in the normal use of apparatus of the character shown in Fig. 1, by a proper adjustment of the adjustable needle valve 27, or other suitable adjustment of the flow capacity of the conduit connection 26 between the pipe 25 and the bellows L because of the effect of such flow on the movements of the pilot valve 5 and of power cylinder F. When air flows into the bellows L through the passage 26 because the pressure in the pipe 25 is higher than the pressure in the bellows the resultant increase in the pressure in the bellows space L tends to move the bellows end wall 16 away from the nozzle 20, and thus reduce the pressure maintained in the pipe 25. When the flow through the passage 26 is out of the bellows L because the pressure is higher in the bellows than in the pipe 25, the bellows wall 16 tends to move toward the nozzle 20 and thereby increase the pressure maintained in the pipe 25.

When the valve 27 is tightly closed so that no flow through the passage 26 can occur, the air trapped in the bellows L operates on the wall 16 just as would a compression spring interposed between the movable wall 16 and stationary wall 19. In such case, the control of the position of the power cylinder piston F by the controlling pressure in the bellows 3 would be of the proportional type and would include no rate component and frequent over-travel of the piston would occur under normal operating conditions. In such case, a change in the controlling pressure in the bellows 3 produces a movement of the piston F which continues until its effect on the wall 16 increases the pressure in the bellows 10 sufficiently to return the pilot valve member 5 to its normal position. If the velocity of the movement of the piston F is significant when the pilot valve member 5 is returned to its normal position, as it then frequently will be, the inertia of the piston and associated parts will cause the piston to move beyond the point at which its motion should be arrested.

When the adjustment of the valve 27 permits flow through the passage 26, a rate component is included in the control effect. For example, on an increase in the air pressure in bellows 3 and a consequent movement of the valve member 5 to the left, downward movement of the piston F, and closing movement of valve I, the back pressure developed at the nozzle 21 and transmitted through the pipe 25 to the bellows 10 initially builds up as required to return the valve member 5 to or beyond its normal position, depending upon the adjustment of the valve member 27. As a result the air pressure to the piston F is respectively cut off or reversed prior to the time that the piston F and valve I reach their final positions. As air thereafter gradually leaks from the pipe 25 to the bellows L through the needle valve 27, the wall member 16 is moved away from the nozzle 21 with the result that the back pressure developed at the nozzle and applied to the bellows 10 is reduced and a further movement of the valve member 5 toward the left is permitted. This again effects the application of air pressure to the chamber above the piston F and thereby causes a further application of downward force on the piston F. In this manner, another step toward the final balance position of the piston F and of the valve I is taken. These steps are repeated until the pressures in the bellows 3, 10 and 17 are qualized. Thus the movement of the valve I is slowed down or checked by the approach of valve member 5 to its normal position before the piston F and valve member I reach their final positions.

Such step by step action results when the needle valve 27 does not permit a large enough rate of flow between the pipe 25 and the bellows L, and therefore, too much rate action is present. In practice, the needle valve 27 should be opened until the action of the piston F and of the valve I arriving at their final desired positions is smooth or critically damped. That is to say, if the adjustment of the valve 27 permits a smaller rate of flow through the conduit 26 than is required for ideal operation, the motion of the valve I will be interrupted before the valve reaches the position in which it is to be maintained. This will result in one or more small adidtional movements of the valve I in the same direction before said valve attains its position corresponding to the temperature of the thermometer bulb D. While such intermittent movements of the bellows valve into its final position are not ordinarily desirable, they are ordinarily much preferable to the over-travel of the butterfly valve I which would occur if the passage 26 were omitted or was too greatly restricted for the needle valve 27. With such approximation to the ideal adjustment of the valve 27 as can be obtained or closely approximated in ordinary practice, a normal change in the controlling pressure in the bellows 3 may be made to result in a continuous movement of the butterfly valve into its appropriate new position, with a velocity which reduces as that condition is approached, so that the motion of the butterfly valve I will terminate when the butterfly valve attains said position. The apparatus shown in Fig. 1 is thus characterized by the simplicity and effectiveness with which it combines a rate control action with a proportional or position control action.

Overtravel of the butterfly valve I when adjusted in the opposite direction as a result of a decrease of pressure in the bellows 3 is effected in a similar manner. Thus, on a decrease in pressure in bellows 3 and a resultant movement of the valve member 5 to the right and an upward movement of the piston F, the nozzle back pressure transmitted through the pipe 25 to the bellows 10 initially decreases an amount sufficient to effect a return of the valve member 5 to or beyond its normal position. Whether the valve member 5 returns exactly to its normal position or is adjusted to a position left of that position depends upon the adjustment of the needle valve 27. Such return movement of the valve member 5 is respectively operative to cut off or reverse the actuating air pressure to the piston F before the piston F reaches the position into which it is to be finally adjusted. Inasmuch as the nozzle back pressure has been reduced, air will gradually leak from the bellows L to the pipe 25 with the result that the wall member 16 will move toward the nozzle 21 to cause the nozzle back pressure transmitted to the bellows 10 to be increased. The resulting movement of the valve member 5 toward the right will again effect the application of actuating air pressure to the piston positioner G in the proper direction to effect a further upward movement to the piston F and an opening movement of the valve I. Such step by step action is repeated as in the case above described of an increase in pressure in the bellows 3, until the pressures in the bellows 3, 10 and 17 are equalized. The result is that the movement of the piston F and of the valve I is slowed down or checked by the approach of the valve member 5 to its normal position before the piston F and valve I reach their final positions. With proper adjustment of the needle valve 27, the action of the piston F and of the valve I in arriving at their final positions is smooth or critically damped.

To accommodate the crank shaft H and internal crank arm H', the horizontal cross section of the lower end of the chamber in the air cylinder G of Fig. 1, is made substantially larger than the cross section of the upper portion of the chamber in which the piston F works. Furthermore, the vertical extent of the air space beneath the piston F is usually substantially greater than that of the air space above said piston. In consequence of the excess in volume of the air space beneath the piston over the volume of air space above the piston, the pressure changes more slowly in the air space below the piston F than in the space above the piston F. This results in the inherent tendency for adjustments of the piston F in the upward direction to be effected more slowly than adjustments in the down direction. This tendency to adjustments of the piston H in opposite directions at different rates may be avoided when considered necessary or desirable, by a rearrangement of the power cylinder which will permit the pressure changes therein to be effected in such manner as to insure adjustments in opposite directions at substantially the same rates, under normal operating conditions.

One power cylinder modification for the purpose specified is illustrated in Fig. 2 wherein two coaxial pistons FA and FB of the same diameter work in the opposite end portions of coaxial power cylinder sections GA and GB which have their remote ends closed to the atmosphere but have their adjacent ends open to the atmosphere so that the connection of the pistons to the final control element may present no air leakage problem. As shown in Fig. 2, the two pistons FA and FB are connected by a piston stem $F^5$ and the latter is connected by a link $F^6$ to a crank shaft H which may be similar in form and may serve the same purposes as the crank shaft H of Fig. 1. The air space between the piston FA and the closed end of the power cylinder section GA may be connected by the pipe 61 to the pilot valve E, as is the lower end of the power cylinder G of Fig. 1. Similarly, the air space between the piston FB and the closed end of the power cylinder section GB may be connected by the pipe 71 to the pilot valve E, as is the upper end of the cylinder G of Fig. 1.

As shown, the cylinder sections GA and GB are integrally connected by a cylinder section GC larger in diameter than the sections GA and GB and formed at one side with an opening GC' for the passage of the operating connections between the piston stem $F^5$ and the butterfly valve I. As shown in Fig. 2, said operating connections include a lever journalled on a pivot shaft H and having an arm H' connected by a link $F^6$ to the piston stem $F^5$, and having its second arm $H^2$ connected to one end of the link $I^3$. As shown, the pivot shaft H is mounted in portions of the cylinder section GC at opposite sides of the opening GC'. Individually considered, the piston sections FA and FB each constitutes a single acting piston, but collectively the two piston sections FA and FB and their connecting stem $F^5$ constitute a double acting piston.

The arrangement shown in Fig. 2 differs operatively from that shown in Fig. 1, only as a result of the fact that in an intermediate position of the valve I, the cylinder end portion at the right of the piston section FA of Fig. 2 may be equal in diameter and length to the cylinder end portion at the left of the piston section FB. In consequence similar movements of the composite piston comprising sections FA and FB, away from the intermediate position shown in Fig. 2, may be made with the same speed. As the composite piston moves away from its intermediate position in either direction, the cylinder end portion to which air under pressure is then being supplied to effect such movement, increases in volume with a resultant tendency to slow down the piston movement as the distance from the intermediate position increases. Ordinarily that tendency is advantageous. As will be apparent, air leakage through the opening GC can occur only as a result of leakage past one or the other of the piston sections FA and FB, and the latter may be constructed and arranged to prevent such leakage or keep it too small to be significant.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. In a control system of the type comprising an air actuated power cylinder including a reciprocating piston, a pilot valve operable to connect a source of air under pressure to one end or the other of said cylinder on adjustment of said valve away from a neutral position in one direction or in the opposite direction, and operable when connecting either end of the cylinder to said source to connect the other end of the cylinder to exhaust, the combination of a first expansible chamber having a movable wall tending to move said valve member in said one direction on a pressure increase in said chamber, a second expansible chamber having a movable wall tending to move said valve member in said opposite direction on a pressure increase in said second chamber, means for maintaining a controlling air pressure in said first chamber varying in predetermined accordance with changes in a controlling condition, means operable to maintain an air pressure in said second chamber varying in accordance with the varying positions in said cylinder of said piston and comprising a third expansible chamber having a movable wall, a force transmitting connection including a spring between said piston and the last mentioned movable wall and moving the latter in the direction to contract said third chamber on a movement of said piston by an increase in the first chamber pressure, an air pressure regulator having a controlled air pressure space connected to and in free communication with said second chamber and connected to and in restricted communication with said third chamber, and means through which movements of the last mentioned movable wall which contract and expand said third chamber adjust said regulator to respectively increase and decrease the air pressure in said space.

2. A control system combination as specified in claim 1, in which the connection between said regulator outlet and the third chamber is adjustable to vary the rate at which said piston approaches a position corresponding to the value of the control pressure following a change in the latter.

3. A control system combination as specified in claim 1 in which said valve chamber is open at each end and said valve member is mounted for axial movement therein, and in which said first and second expansible chambers are in alignment with said valve member and have their movable walls facing one another and engaging the opposite ends of said valve member.

4. A control system combination as specified in claim 1, in which said air pressure regulator comprises a bleed nozzle having a restricted inlet for air under pressure and having a bleed orifice which is subjected to a throttling effect by the end wall of said third chamber which is increased and decreased as said third chamber contracts and expands, and in which said regulator pressure space comprises the space in said bleed nozzle between said restricted inlet and bleed orifice, and means connecting the bleed nozzle to a source of air under pressure and to said second expansible chamber.

DONALD PRESTON ECKMAN.

REFERENCES CITED

The following references are of record in the file of this patent:

UNITED STATES PATENTS

| Number | Name | Date |
| --- | --- | --- |
| 2,314,952 | Scharpf | Mar. 30, 1943 |
| 2,372,345 | Temple | Mar. 27, 1945 |